(12) United States Patent
Un et al.

(10) Patent No.: US 8,983,490 B2
(45) Date of Patent: Mar. 17, 2015

(54) LOCATING A MOBILE DEVICE

(75) Inventors: Edward Ding-Bong Un, Beijing (CN); Jun Zhao, Beijing (CN); Kai Wang, Beijing (CN); Hailong Mu, Beijing (CN); Zeyong Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 13/431,444

(22) Filed: Mar. 27, 2012

(65) Prior Publication Data

US 2013/0260781 A1 Oct. 3, 2013

(51) Int. Cl.
*H04W 24/00* (2009.01)
*G01S 5/00* (2006.01)
*G01S 5/02* (2010.01)
*G01S 5/10* (2006.01)
*H04W 64/00* (2009.01)

(52) U.S. Cl.
CPC .............. *G01S 5/00* (2013.01); *G01S 5/0252* (2013.01); *G01S 5/10* (2013.01); *H04W 64/00* (2013.01)
USPC ................ 455/456.1; 455/456.2; 455/456.3

(58) Field of Classification Search
USPC .......................................... 455/456.1, 456.3
See application file for complete search history.

(56) References Cited

U.S. PATENT DOCUMENTS

| 6,029,070 | A | 2/2000 | Kingdon et al. |
| 6,990,428 | B1 | 1/2006 | Kaiser et al. |
| 7,317,419 | B2 | 1/2008 | Sugar et al. |
| 7,319,877 | B2 | 1/2008 | Krumm et al. |
| 8,077,090 | B1 | 12/2011 | Chintalapudi et al. |
| 8,200,251 | B2 * | 6/2012 | Huang ........................ 455/457 |
| 2004/0085909 | A1 | 5/2004 | Soliman |
| 2005/0246334 | A1 | 11/2005 | Tao et al. |
| 2006/0075131 | A1 | 4/2006 | Douglas et al. |
| 2006/0199546 | A1 | 9/2006 | Durgin |
| 2008/0188242 | A1 | 8/2008 | Carlson et al. |
| 2008/0200181 | A1 | 8/2008 | Zill |
| 2011/0179027 | A1 | 7/2011 | Das et al. |

(Continued)

FOREIGN PATENT DOCUMENTS

| EP | 2360605 A1 | 8/2011 |
| KR | 20090059920 A | 6/2009 |
| WO | 2011071199 A1 | 6/2011 |

OTHER PUBLICATIONS

Int. Search Report cited in PCT Application No. PCT/US2013/029735 dated May 31, 2012, 10 pgs.

(Continued)

*Primary Examiner* — Huy C Ho
(74) *Attorney, Agent, or Firm* — Dave Ream; Jim Ross; Micky Minhas

(57) ABSTRACT

One or more techniques and/or systems are disclosed for identifying a location of a mobile device (e.g., with user consent). A set of one or more indications of received signal strength (RSS) may be received, comprising a first RSS from a first access point (AP). The set of RSS indications may be used to identify a grid area, comprising a first grid space. An expected distance between the first grid space and the first AP may be identified using the first RSS. The expected distance can be combined with a first known distance between the first grid space and the first AP to determine a first grid score for the first grid space. A second grid score may be determined for a second grid space (e.g., and a third, fourth, etc.), and the grid space comprising a desired grid score (e.g., highest) may be selected as the mobile device location.

20 Claims, 9 Drawing Sheets

(56) References Cited

U.S. PATENT DOCUMENTS

| | | | |
|---|---|---|---|
| 2011/0304503 | A1 | 12/2011 | Chintalapudi et al. |
| 2011/0320539 | A1 | 12/2011 | Zhao et al. |
| 2012/0310746 | A1 | 12/2012 | Zhao et al. |

OTHER PUBLICATIONS

Bose, et al., "A Practical Path Loss Model for Indoor WiFi Positioning Enhancement", Retrieved at <<http://ieeexplore.ieee.org/ielx5/4446227/4449533/04449717.pdf?tp=&arnumber=4449717&isnumber=4449533>>, 6th International Conference on Information, Communications & Signal Processing, Dec. 10, 2007, pp. 1-5.

Bshara, et al. "Localization in WiMAX Networks Based on Signal Strength Observations", Retrieved at <<http://www.ieee-globecom.org/2008/downloads/DD/DD16W2%20Localization/DD16W2%20Bshara%20M/WiMAX_RSS-Loc_IEEE.pdf>>, 2008, pp. 5.

"Location Tracking Approaches", Retrieved at <<http://www.cisco.com/en/US/docs/solutions/Enterprise/Mobility/wifich2.html>>, Retrieved Date: Dec. 23, 2012, pp. 8.

Seidel, et al., "914 MHz Path Loss Prediction Models for Indoor Wireless Communications in Multifloored Buildings", Published Date: Feb. 1992, Proceedings: IEEE Transactions on Antennas and Propagation, pp. 207-217 http://ieeexplore.ieee.org/stamp/stamp.jsp?tp=&arnumber=127405.

Krumm, et al., "LOCADIO: Inferring Motion and Location from Wi-Fi Signal Strengths", Published Date: Aug. 22, 2004, Proceedings: First Annual International Conference on Mobile and Ubiquitous Systems: Networking and Services (Mobiquitous, 2004), http://research.microsoft.com/en-us/um/people/horvitz/locadio.pdf.

Tsuchiya, et al., "Localization Algorithms for Distributed Platform among Vehicles"—Published Date: Oct. 12, 2009, Proceedings: International Conference on Ultra Modern Telecommunications & Workshops, 2009 (ICUMT '09), pp. 1-6, http://ieeexplore.ieee.org/stamp/stamp.jsp?tp=&arnumber=5345615.

Chintalapudi, et al., "Indoor Localization without the Pain"—Published Date: Sep. 20, 2010 Proceedings: Proceedings of the Sixteenth Annual International Conference on Mobile Computing and Networking (MobiCom'10), http://research.microsoft.com/pubs/135721/ez-mobicom.pdf.

Ji, et al., "Ariadne: A Dynamic Indoor Signal Map Construction and Localization System"—Published Date: Jun. 19, 2006, Proceedings: Proceedings of the 4th international conference on Mobile systems, applications and services (MobiSys '06), pp. 151-164, http://www.usenix.org/events/mobisys06/full_papers/p151-ji.pdf.

Wang, et al., "Residual Ranking: A Robust Access-Point Selection Strategy for Indoor Location Tracking"—Published Date: Oct. 11, 2009, Proceedings: IEEE International Conference on Systems, Man and Cybernetics, 2009. (SMC 2009), pp. 5035-5040, http://ieeexplore.ieee.org/stamp/stamp.jsp?tp=&arnumber=5346041.

Gorrich, et al., "Alternatives for Indoor Location Estimation on Uncoordinated Environments"—Published Date: Sep. 2, 2011, Proceedings: IEEE 13th International Conference on High Performance Computing and Communications (HPCC), 2011, pp. 971-976, http://ieeexplore.ieee.org/stamp/stamp.jsp?arnumber=06063108.

Non-Final Office Action cited in U.S. Appl. No. 13/431,497 dated Dec. 15, 2014, 18 pgs.

* cited by examiner

LOCATING A MOBILE DEVICE

BACKGROUND

Many computing devices are portable, and many mobile devices may be interactive with a user's surroundings. For example, a mapping application running on a user's mobile device (e.g., smartphone) may allow the user to identify their approximate location on a map displayed on the mobile device. Further, points of interest, retails establishments, entertainment venues, and more, can be indicated on such a map, for example, which can be searched for, and/or identified as the user moves through an area. Typically, mobile devices use global positioning systems (GPS), which utilize satellite triangulation, or some sort of signal triangulation (e.g., mobile phone signal) to identify the approximate location of the user. This location information can be used by various applications on the user's device, such as to provide appropriate and relevant local information, identify the user's location for social networking, interact with local devices/services, and more.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Current global positioning systems (GPS) and/or other location identification services used on mobile devices may not provide needed fidelity for some user-experiences, such as applications running on the mobile device, and/or information provided to mobile device data providers. For example, while the GPS can provide a relative position of the user to a mapped point, GPS-type location tracking loses reliability when a mobile device is inside a building or under cover (e.g., parking garage). Even in optimal conditions, a GPS may not be able tell that the user is inside a particular building, standing in front of a particular display in a store, etc. Further, as an example, an approximate position of a user provided via mobile signal triangulation may not meet granularity requirements to sufficiently locate the user, such as for identifying a location of the user from several potential/overlapping locations.

Other current or previous wireless technologies for mobile device location may utilize respective signal strengths detected by the mobile device from one or more wireless access points (APs). However, these technologies need to do extensive site surveys to collect radio signatures, which may quickly become unusable if the indoor environment changes (e.g., due to renovation, and/or AP location change). Further, these technologies typically rely on an ideal path loss model, which is very difficult to properly utilize in an indoor environment. Additionally, these types of technologies are not typically scalable in a manner that allows the device location to be determined efficiently in a cloud based environment.

Accordingly, among other things, one or more techniques and/or systems are disclosed for locating a mobile device, for example, where GPS and/or mobile signal triangulation may not be sufficient (e.g., indoors and/or where a more accurate position is desired), and where site surveys may not be necessary. Local, known access points, such as wireless access points used for network access (e.g., WiFi) may be utilized to more accurately identify a location of a user's mobile device. For example, a signal strength received by the mobile device, from one or more access points (APs), can be used to identify an estimated distance between the mobile device and the one or more access points. Further, in this example, the estimated distance(s) may be compared with a known distance between the access point(s) and grid spaces identified in an area. A score may be generated for the respective grid spaces, for example, and a particular grid space or square comprising a desired grid score may be selected as the location of the mobile device.

In one embodiment of identifying a location of a mobile device, a first expected distance between a first grid space associated with a mobile device and a first access point (AP) can be determined using a first received signal strength (RSS). Here, the first RSS may comprise an indication of signal strength for the first AP. Further, a first grid score for the first grid space can be determined based at least on a combination of the first expected distance and a first known distance. The first known distance may comprise a known distance between the first AP and the first grid space. Additionally, the mobile device location can be identified based at least on the first grid score.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
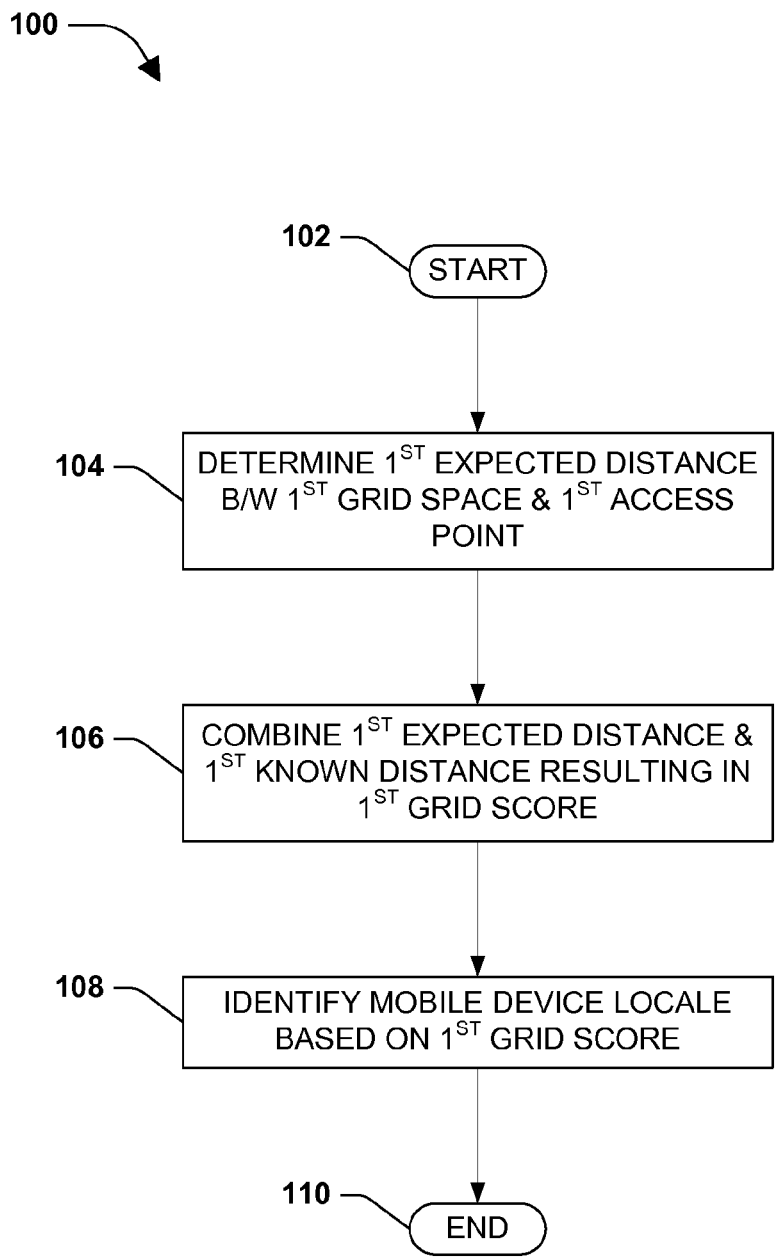
FIG. 1 is a flow diagram illustrating an exemplary method for identifying a location of a mobile device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for locating a mobile device, such as inside a building. Whereas global positioning systems (GPS) tend to stop working properly indoors, one or more local wireless transmission sites (e.g., wireless access points (WAPs)) may be used to provide an accurate, reliable location of the mobile device. Further, a location service may be able to remotely (e.g., cloud-based) identify the mobile device using signals received from the one or more wireless transmission sites (e.g., provided a user consents to the same). An area, such as a floor of a building, may be broken down into a grid, where a distance between respective grid spaces (e.g., squares) and respective one or more wireless transmission sites is known. Respective signal strengths of received transmissions can be used in combination with the known distances, for example, to identify where the mobile device is located in the area.

FIG. 1 is a flow diagram illustrating an exemplary method 100 for identifying a location of a mobile device. The exemplary method 100 begins at 102. At 104, a first expected distance between a first grid space and a first access point (AP) is determined using a first received signal strength (RSS). The first RSS comprises an indication of signal strength for the first AP. As one example, an area in which the mobile device (e.g., smartphone) may be located can comprise a grid dividing the area into one or more grid spaces, comprising at least the first grid space. In this example, a location of the first grid space (e.g., and a second grid space and a third grid space, etc. of the grid) may be known. For example, a building of a floor may comprise a rectangle shape, over which can be laid a grid made up of sixty grid spaces (e.g., a grid having ten columns and six rows).

As another example, a RSS may be used to identify an estimated distance between a receiver of the RSS and a transmitter of the RSS. In one embodiment, the transmitter of the first RSS can comprise the first AP and the receiver of the first RSS can comprise the mobile device. For example, the first RSS, comprising an indication of signal strength for the first AP, may have been received by the mobile device and used to determine the first expected distance by estimating the distance between the transmitter (e.g., the first AP) and the receiver (e.g., the mobile device). Further, as one example, a location of the mobile device may be unknown when determining the expected distance. In this example, the first grid square may be used as a "potential" location of the mobile device, and the first expected distance can comprise the estimated distance (e.g., determined using the first RSS) between the first grid space and the first AP, as if the mobile device was located in the first grid space.

At 106 in the exemplary method 100, a first grid score is determined for the first grid space based at least on a combination of the first expected distance and a first known distance. The first known distance comprises a known distance between the first AP and the first grid space. As one example, a location of the respective grid spaces in a grid, such as overlaying an area (e.g., a floor of a building), can be known. Further, for example, a location of the first AP (e.g., and other APs if present) may be known. In this way, a distance between the first grid space and the first AP may also be known, comprising the first known distance.

In one embodiment, the first grid score may be determined by combining the first expected distance and a first known distance using a grid-space scoring formula. As one example, a difference between the first expected distance and a first known distance can be calculated (e.g., normalizing a result of subtracting the expected distance from the known distance), and the distance difference may be used as an input to the grid-space scoring formula. In this example, the result of the inputting the distance difference may comprise a likelihood value (e.g., a percentage, absolute value, etc.), indicating a likelihood that the mobile device is located in the corresponding grid-square (e.g., the first grid square).

At 108 in the exemplary method 100, the mobile device location may be identified based at least on the first grid score. As one example, if a grid score represents a likelihood that the mobile device is located in the corresponding grid-space, the grid-space comprising a highest grid score may be selected as most likely to comprise the location of the mobile device. For example, a grid-score may be determined for respective sixty grid-spaces comprised in a grid (e.g., a six by ten grid) overlaying an area (e.g., a floor of a building). In this example, the grid-space of the sixty spaces that comprises a desired grid score (e.g., highest) may be selected as the location of the mobile device.

Having identified the mobile device location, the exemplary method 100 ends at 110.

Figure 2:
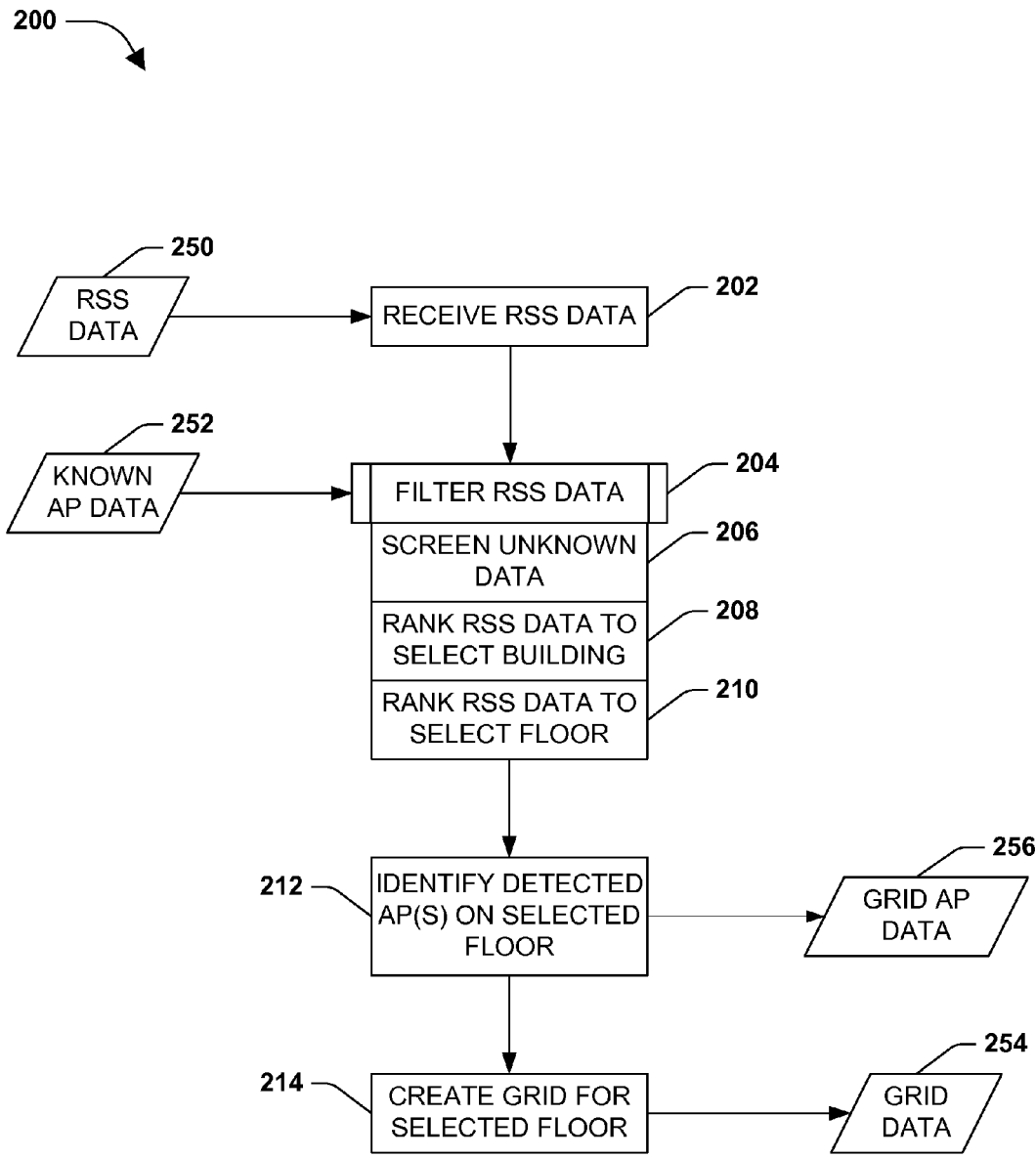
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. In the example embodiment 200, RSS data 250 may be received, at 202. In one embodiment, a mobile device may be located in an area that comprises one or more access points, and the mobile device may receive one or more transmitted signals from the respective one or more access points. As one example, an access point may comprise at least a transmitter that sends out wireless signals for communication with wireless configured devices. For example, an access point may comprise a WAP used to connect to a network (e.g., the Internet), a device locator beacon, a cell site (e.g., for mobile phones), etc.

In this embodiment, for example, the mobile device may periodically (e.g., or when needed for location services) send the RSS data 250, comprising an RSS report for respective one or more APs detected (e.g., provided a user consents to the same). In this example, the RSS report may comprise one or more RSSs for the corresponding one or more APs, indicating signal strengths for the APs, and/or AP identifiers (ID) that identify the APs to which the one or more RSSs correspond. In one embodiment, the RSS data 250 may be sent to a remote device locator service (e.g., a cloud-based service for locating the mobile device), for example, based on a request from a user of the mobile device and/or some service active on the mobile device.

At 204 in the example embodiment 200, the RSS data may be filtered, for example, resulting in a set of one or more filtered RSSs (e.g., and corresponding AP IDs). At 206, filtering the RSS data can comprise screening out RSS data that corresponds to an unknown AP. As one example, if an AP is unidentified (e.g., no corresponding AP ID) a location of the unidentified AP may also be unknown (e.g., which may prevent determining a known distance). Further, an unknown AP may comprise one for which the AP ID is not linked to known AP data 252. For example, an AP ID may be used to identify the AP and the location of the identified AP, such as by performing a look up in one or more AP databases (e.g., linking AP IDs to respective AP locations). In this example, the one or more AP databases can comprise the known AP data 252, which may be used to screen out the unknown RSS data, resulting in merely RSS data that is linked to one or more known APs (e.g., comprising a known location).

At 208, filtering the RSS data 250 can comprise ranking the RSS data to select a building location for the mobile device. In one embodiment, respective one or more RSSs (e.g., respectively corresponding to a different AP), in the set of unfiltered RSS data (e.g., screened for unknown APs), may be ranked in order of signal strength. As one example, a first RSS in the ranking may comprise a highest signal strength, a second RSS (e.g., next) in the ranking may comprise a next-highest signal strength, and so-on.

In one embodiment, a top "K" RSSs (e.g., where K indicates a number of desired RSSs used) may be selected from the ranking for subsequent filtering (e.g., if desired). In one embodiment, merely those RSSs that meet a desired RSS threshold (e.g., above a desired signal strength) may be selected for further processing. As one example, the one or more RSSs selected may be associated with APs that are located in a building in which the mobile device may reside. That is, for example, merely those APs that comprise a strong enough RSS are selected as likely to be located in the same building as the mobile device (e.g., filtering out APs in other buildings).

At 210 in the example embodiment 200, filtering the RSS data 250 can comprise ranking the RSS data to select a floor location (e.g., or a portion thereof), in the selected building, for the mobile device. As one example, the one or more RSSs selected for the building may be further ranked to select a particular floor (e.g., or portion thereof) in the building (e.g., based on a top K RSSs, and/or an RSS threshold indicative of the floor locality).

In one embodiment, filtering the potential location of the mobile device to a certain building and floor can be used to improve accuracy in two-dimensional positioning (e.g., compared with that of three-dimensional positioning). As one example, most APs that are not within the boundary of a building may be filtered using a weighted RSS value and/or RSS count, which can also be very accurate for floor ranking. In this example, when one or more candidate buildings and/or one or more candidate floors are very close (e.g., the RSS ranking scores of different buildings and/or floors by weighted RSS and/or RSS count do not differ significantly from each other), a three-dimensional location inference may be utilized, and/or multiple RSS ranking scores can be computed and compared for respective building and/or floor candidates.

At 212 in the example embodiment 200, one or more APs located on the selected floor (e.g., or portion thereof), of the selected building, may be identified. As one example, respective AP identifiers (IDs) may be received in RSS data for one or more APs. Further, as an example, respective AP IDs may be used to identify respective AP locations of the one or more APs, such as from a database comprising known locations of different APs, for example. The location of an AP can be used to determine whether the AP is located on the selected floor (e.g., or portion thereof), and may be also used for subsequent score computation(s) for grid data 254, for example In one example, the identification of the one or more APs located on the selected floor may result in grid AP data 256 comprising respective locations and/or IDs for the one or more APs located on the floor.

At 214 in the example embodiment 200, having selected the candidate area (e.g., floor, or portion thereof), potentially comprising the location of the mobile device, a grid can be created, resulting in grid data 254 for the candidate area, which may be used to overlay the selected candidate area. As one example, the candidate area may be selected based at least on the set of one or more filtered RSSs, respectively corresponding to one or more APs (e.g., located in the candidate area), which may have been filtered by unknown APs, by building, and/or by floor. In this example, the grid can be created to comprise the selected candidate area, where the grid may comprise a location of the mobile device.

Figure 5:
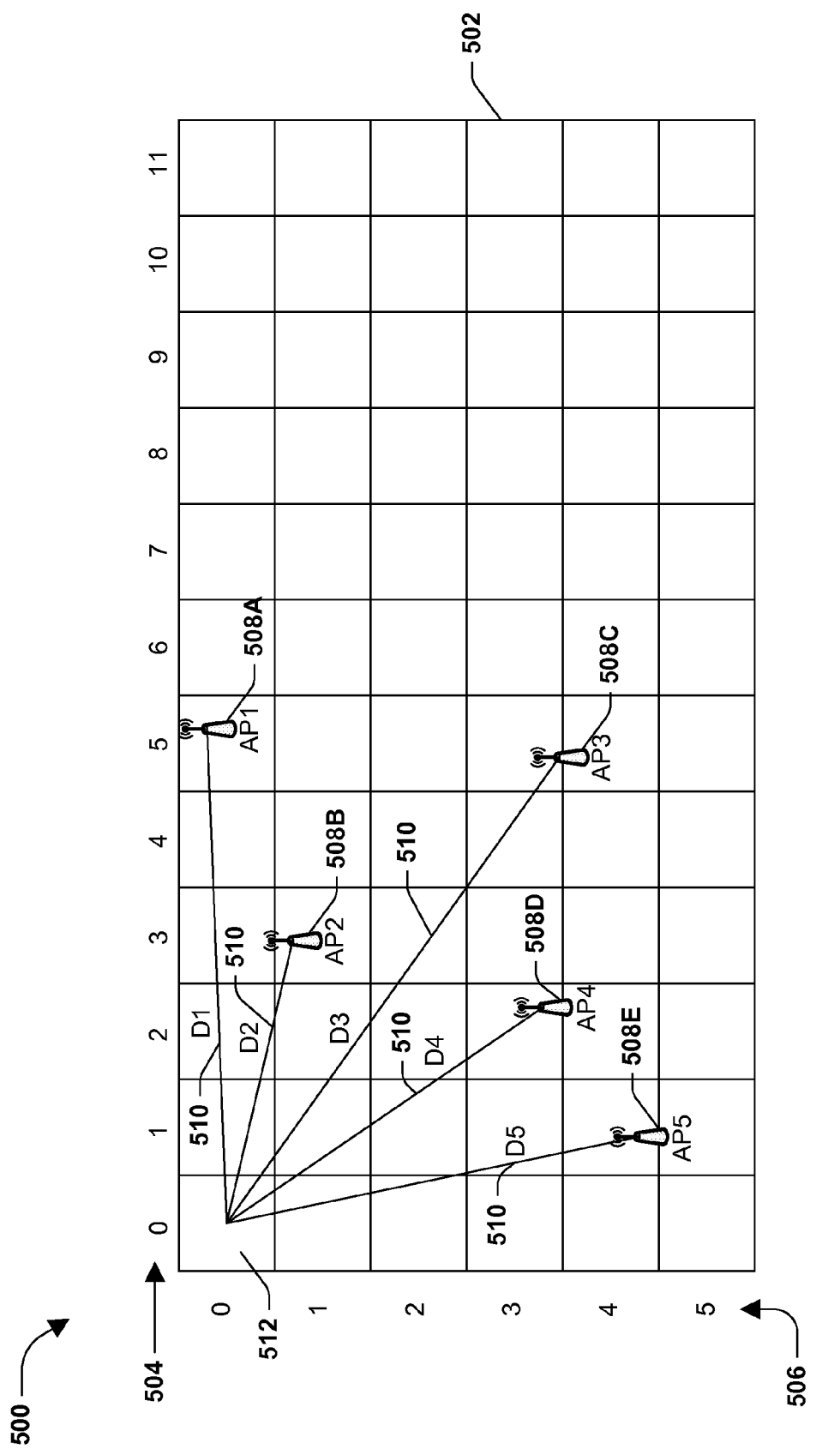
FIG. 5 illustrates an example embodiment where one or more portions of one or more techniques described herein may be implemented.

Further, the created grid can comprise one or more grid spaces, for example, respectively corresponding to a grid coordinate and, therefore, a known location relative to the candidate area. As an illustrative example, FIG. 5 illustrates an example embodiment 500 where one or more portions of one or more techniques described herein may be implemented. In the example 500, a grid 502 comprises column coordinates 504 and row coordinates 506, respectively corresponding to a grid space, such as first grid-space 512. As one example, the grid 502 may correspond to (e.g., in size and shape) the candidate area, such as a selected floor of a selected building. In this example, the first grid-space 512 (e.g., as well as other grid-spaces in the grid 502) can correspond to a known location in the candidate area.

Figure 3:
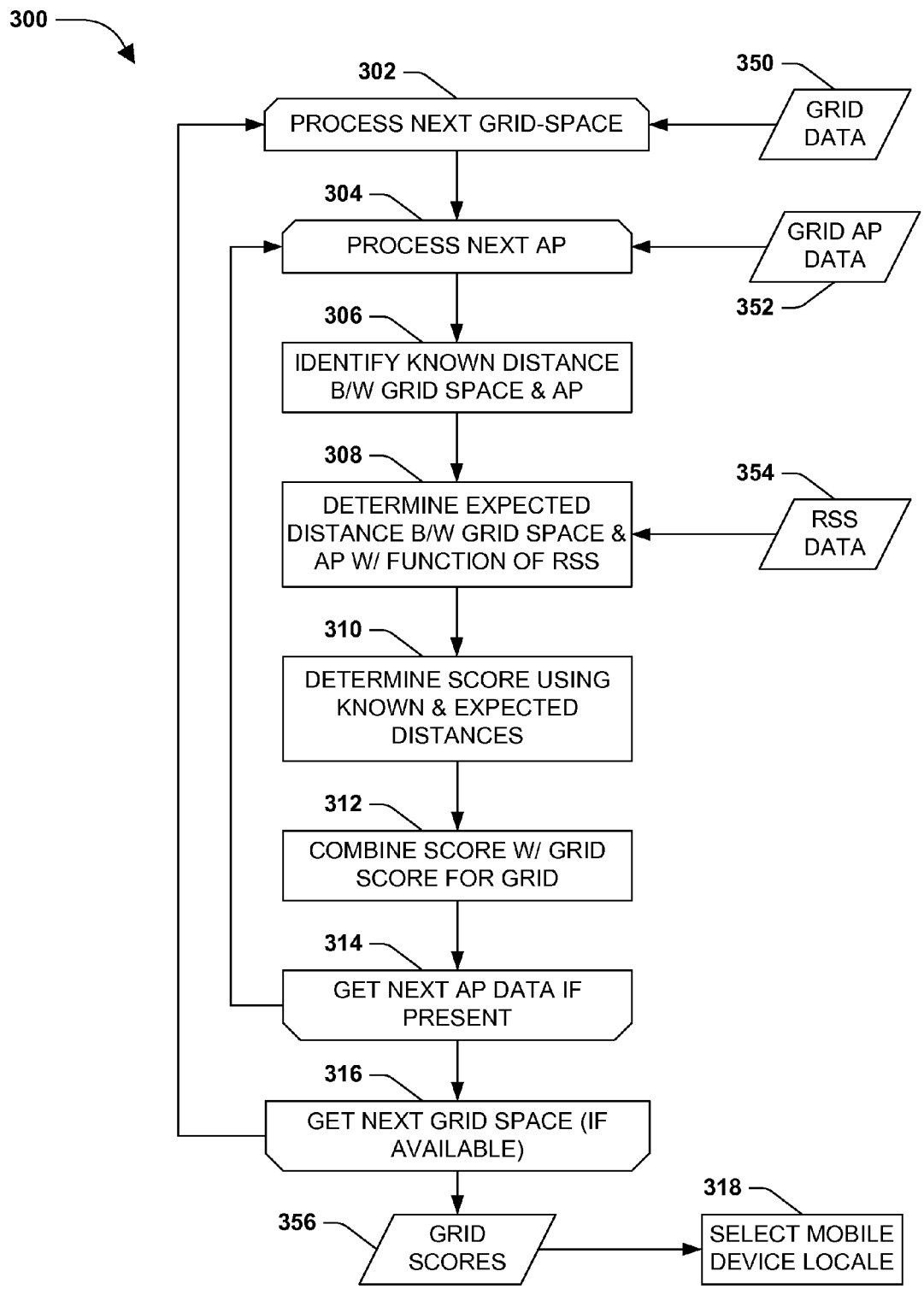
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. In this example embodiment 300, grid data 350 (e.g., 254 of FIG. 2) for a selected candidate area (e.g., potentially comprising a location of the mobile device), grid AP data 352 (e.g., data comprising AP IDs and/or AP locations, such as 256 of FIG. 2), and RSS data 354 (e.g., comprising a set of filtered RSS data corresponding to one or more APs located in the candidate area, such as provided by 204 of FIG. 2) may be used to identify a location of the mobile device (e.g., in the candidate area). It may be appreciated that utilizing grid AP data 352 (e.g., instead of known AP data, such as 252 in FIG. 2) may simplify processing. That is, known AP data, for example, may comprise information on (many) more APs than grid AP data 352, which generally pertains to merely those APs that have been identified as being on the selected floor, such that APs that are likely not of interest are weeded out (e.g., so that resources are not unnecessarily consumed in considering these (likely irrelevant) APs in computing grid scores, for example).

At 302, a next unprocessed grid-space (e.g., the first grid-space) from the grid data 350 may be selected. As one example, respective grid-spaces in the grid (e.g., 502 of FIG. 5) may be processed to identify a grid-score 356 for the respective grid-spaces, starting with the first grid-space (e.g., 512 of FIG. 5). For example, processing a next grid-space may comprise selecting a grid-space from the grid, for which no grid-score has been determined.

At 304, a next, unprocessed AP can be selected for processing, for the selected grid space. As an illustrative example, in FIG. 5, the selected candidate area (e.g., comprising the grid 502) may comprise a plurality of APs 508 (A-E). In this example, for the first grid-space 512, the respective APs 508 may be processed (e.g., starting with a first AP 508A) to determine the grid score for the first grid-space 512.

Returning to FIG. 3, at 306, a first known distance between the first grid space and the first AP can be identified. As an illustrative example, in FIG. 5, a location of the first AP 508A may be known from the grid AP data (e.g., 352 of FIG. 3), and the location of the first grid-space is known (e.g., based on the grid data 350 of FIG. 3). Therefore, in this example, a first known distance 510A can be determined based on the known location of the first AP 508A and the known location of the first grid-space 512 (e.g., from a center of the grid-space).

Returning to FIG. 3, at 308, a first expected distance (e.g., estimated distance) between the first grid space and the first AP can be determined, using a function of RSS applied to a first RSS. Here, the first RSS can be comprised in received RSS data 354 (e.g., 250 of FIG. 2), and may be indicative of a signal strength from the first AP, received by the mobile device. In one embodiment, the function of RSS applied to a first RSS may comprise a base path-loss function. A path-loss function, for example, may be indicative of a relationship between power density for a signal and distance between the transmitter and receiver increases (e.g., as a signal's electromagnetic wave propagates over a greater distance of space the power density may decrease).

In one embodiment, where a path loss theory model may be used to develop the path-loss function, an ideal relationship between received signal strength and distance may not be necessary. As one example, one or more wireless access points (e.g., IEEE 802.11 APs, and/or other wireless technologies) may be distributed around a given mobile device, and the path-loss function may be applied to accumulated statistical information (e.g., a plurality of RSSs, respectively from different APs) for inferring a mobile device's indoor location. In this embodiment, for example, applying the path-loss function to the first RSS may result in the first expected distance between the first grid-space and the first AP.

At 310 in the example embodiment 300, a first AP score for the first grid-space can be determined, using the first known distance and the first expected distance. As one example, a scoring function may be used to generate the first AP score for the first grid-space, such as by using the first known distance and the first expected distance as input to the scoring function, resulting in an output of comprising the first AP score for the first grid-space. For example, the scoring function may identify a difference between the first known distance and the first expected distance, and/or may apply a score weighting factor based on the RSS for the first AP.

At 312, the first AP score for the first grid-space may be combined with the grid score for the first grid space. As one example, the grid score for the first grid space may be initially set to zero (e.g., as the first AP is the first one processed to generate an AP score for the first grid space), and the first AP score can be combined with zero (e.g., summed with) to generate the grid score for the first grid-space (e.g., at least a first grid score for the first grid-space).

At 314, if another unprocessed AP is indicated for the first grid-space, a second AP may be processed for the first grid-space, at 304. In one embodiment, at 306, a second known distance may be identified between a second AP and the first grid-space, based at least on the grid AP data 352 (e.g., location of second AP) and the grid data 350 (e.g., the location of the first grid-space). Further, at 308, a second expected distance can be determined between the first grid space and the second AP using a second RSS. The second RSS can comprise an indication of signal strength for a signal transmitted from the second AP and received by the mobile device (e.g., comprised in the received RSS data 354). As one example, the base path-loss function may be applied to the second RSS to determine the second expected distance.

At 310, a second AP score can be determined for the first grid-space, using a combination of the second known distance and the second expected distance. As one example, the scoring function may be used to determine the second AP score, where the second known distance and the second expected distance (e.g., and the second RSS) comprise the inputs, and the second AP score for the first grid-space comprises the output. At 312, the second AP score for the first grid-space can be combined with the present or existing score for the first grid space, or the first grid-space grid-score (e.g., comprising at least the first AP score), resulting in an updated first grid-space grid-score (e.g., comprising a combination of the first AP score and the second AP score).

As one example, in the example embodiment 300, the procedural loop of 304 to 314 may be iterated at least until respective APs have been processed for the first grid-space. That is, for example, respective APs that are identified from the set of one or more filtered RSSs (e.g., as described in FIG. 2) may be processed for the first grid-space. As an illustrative example, in FIG. 5, five APs 508 (A-E) are identified as comprised within the candidate area (e.g., floor of a selected building) comprising the grid 502. In this example, an AP score may be determined for the respective APs 508, based at least upon their respective known distances 510 (A-E), and expected distances determined by an associated RSS (e.g., received by the mobile device). The respective AP scores can be combined to determine the grid score for the first grid-space 512.

Returning to FIG. 3, at 316, if a next unprocessed grid-space is present, a second grid-space may be processed at 302. As one example, the procedural loop of 304 to 314 may be iterated at least until respective APs (e.g., comprising the same APs as were processed for the first grid-space) have been processed for the second grid-space. Further, the respective AP scores can be combined, at 312, to determine the grid score for the second grid-space. Additionally, the procedural loop of 302 to 316 may be iterated at least until respective grid-spaces in the grid have been processed, for example, resulting in a grid score 356 for the respective processed grid-spaces. As an illustrative example, in FIG. 5, the respective sixty grid spaces in the grid 502 may be processed, comprising processing the respective APs 508 (A-E) for the respective grid-spaces.

Returning to FIG. 3, at 318, a location of the mobile device may be identified by selecting a grid-space that comprises a desired grid-space score 356 (e.g., one that meets mobile device location criteria). As one example, a grid space that comprises a highest probability (e.g., indicated by the grid-score) of comprising the location of the mobile device may be selected. As one example, a highest grid score may comprise a highest probability, where the known distance/expected distance combination (e.g., difference) for the respective one or more APs of a grid-space is lowest (e.g., the known and expected distances are similar, indicating that the mobile device received the signals at a similar location identified by the known distance).

In one aspect, the base path-loss function may be calibrated for respective APs used to determine the grid score for a grid-space. As one example, the base path-loss function (e.g., based on a theoretically ideal model) may be used for a set of initial grid score determinations. However, a real-world environment (e.g., indoor environment) may comprise elements (e.g., building (structural) components, electrical devices, etc.) that alter electromagnetic signals transmitted by an AP, adjusting a signal strength received from what may be "ideally" expected.

In one embodiment, in this aspect, the base path loss function may be calibrated for an AP (e.g., the first AP) resulting in an AP grid path loss function (e.g., a first AP grid path loss function). Further, in this embodiment, an expected distance (e.g., the first expected distance) can be determined by combining the RSS for the AP (e.g., the first RSS) with the AP grid path loss function (e.g., the first grid path loss function).

Figure 4:
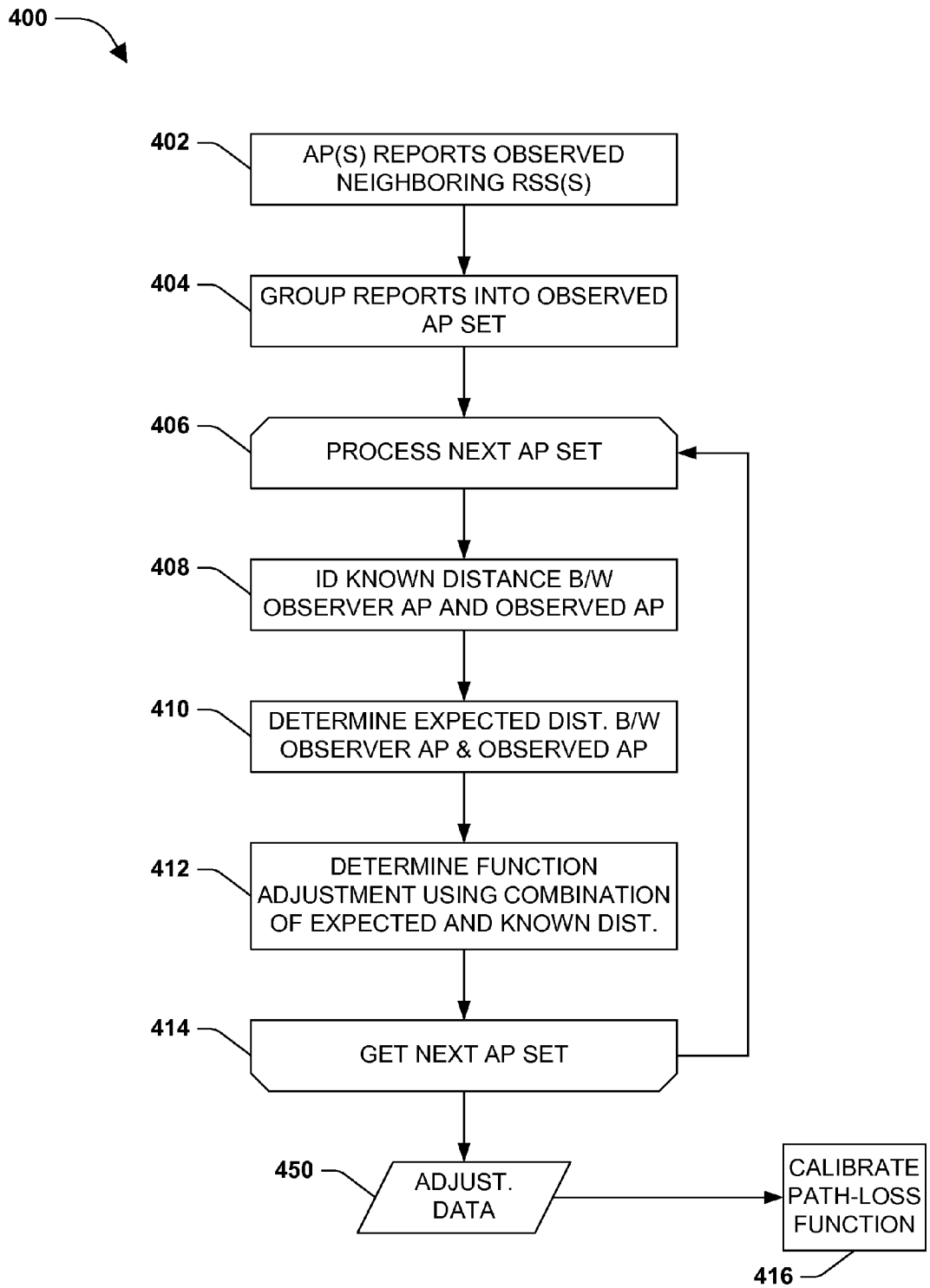
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. In the example embodiment 400, for example, a base path-loss function may be calibrated for respective one or more APs identified for a candidate area comprising a grid. At 402, a second AP reports an observed RSS for a first AP (e.g., a signal strength for a signal transmitted from the first AP and received by the second AP). Further, as an example, a third AP (e.g., and fourth AP, fifth AP, etc.) also reports an observed RSS for the first AP, resulting in a set of one or more observed RSSs for the first AP (e.g., from the second AP, third AP, fourth AP, etc.).

At 404, the one or more reports (e.g., from respective APs) may be grouped into observed AP sets, respectively corresponding to an AP identified for the candidate area comprising the grid. As one example, an observed AP set for the first AP may comprise an RSS report from a second AP, third AP, fourth AP, and fifth AP; while an observed AP set for the second AP may comprise an RSS report from the first AP, third AP, fourth AP, and fifth AP. At 406, a next unprocessed observed AP set can be processed (e.g., the first AP set).

At 408, a known distance between the observer AP (e.g., the second AP, receiving the signal from the first AP) and the observed AP (e.g., the first AP). As one example, the known distance may be identified using grid AP data (e.g., 352 of FIG. 3), which may identify a location of respective APs. At 410, an expected distance can be determined using the RSS reported by the observer AP (e.g., using a base path-loss function).

At 412, the base path-loss function adjustment may be determined, using at least a combination of the known distance between the observed and observer APs and the expected distance between the observed and observer APs. Further, if the observed AP set for the first AP comprises a plurality of observed RSSs (e.g., from the second AP, third AP, etc.), a final base path-loss function adjustment for the first AP may comprise a combination of base path-loss function adjustments determined for the respective observed RSSs in the observed AP set for the first AP. In one embodiment, the resulting adjustment data 450 for the first AP may be used to calibrate the base path-loss function, at 416, resulting in a first calibrated path-loss function (e.g., used merely for the first AP).

In the example embodiment 400, the procedural loop 406 to 414 may be iterated for respective sets of observed RSSs. That is, for example, resulting adjustment data 450 for respective one or more APs may be used to calibrate the base path-loss function, at 416, resulting in one or more calibrated path-loss functions, respectively corresponding to a different AP (e.g., used merely for the corresponding AP in determining the expected distance).

A system may be devised for locating a mobile device, where global positioning systems (GPS) mobile device signal triangulation may not be available (e.g., indoors). Local, known wireless transmitters may be used to identify the location of the mobile device, for example. Further, a remote locator service may be able identify the mobile device location by comparing known distances with expected distances, using indications of received signal strength from one or more local, known wireless transmitters.

Figure 6:
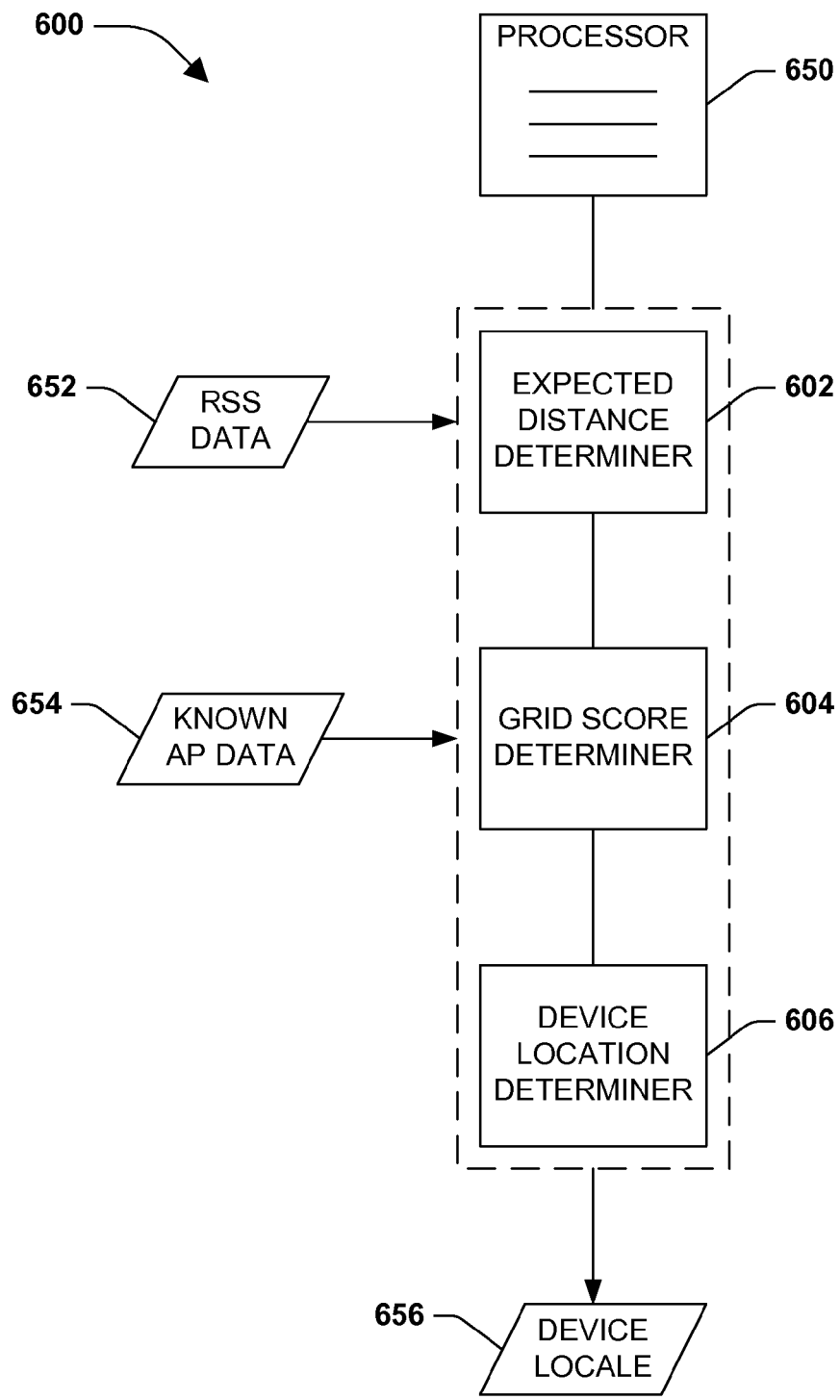
FIG. 6 is a component diagram illustrating an exemplary system for identifying a location of a mobile device.

FIG. 6 is a component diagram illustrating an exemplary system 600 for identifying a location of a mobile device. In the exemplary system 600, an expected distance determination component 602 is configured to determine an expected distance between a grid space and an access point (AP) using an indication of received of signal strength 652 (RSS) associated with the AP. As one example, the expected distance determination component 602 may determine a first expected distance between a first grid space and a first AP using a first RSS, where the first RSS comprises an indication of signal strength for a signal transmitted by the first AP and received by the mobile device. Further, for example, the expected distance determination component 602 may determine a second expected distance between the first grid space and a second AP using a second RSS (e.g., and a third expected distance between the first grid space and a third AP using a third RSS, etc.; and/or a fourth expected distance between a second grid space and the first AP using a fourth RSS; etc.).

In the exemplary system 600, a grid score determination component 604 is operably coupled with the expected distance determination component 602. The grid score determination component 604 is configured to determine a grid score for the grid space based at least on a combination of the expected distance and a known distance between the AP and the grid space (e.g., from known AP data 654). As one example, a first known distance between the AP and the first grid space, based on a known location of the first grid-space and the first AP, may be combined with the first expected distance to determine a first grid score for the first grid space.

In the example embodiment 600, a device location determination component 606 is operably coupled with the grid score determination component 604. The device location determination component 606 is configured to identify the mobile device location 656 based at least on the grid score, where at least a portion of the system 600 is implemented, at least in part, using a computer-based processing unit 650. As one example, the device location determination component 606 may compare the first grid score for the first grid-space with a second grid score for a second grid-space to determine the mobile device location 656. For example, if the first grid score comprise a higher probability that the mobile device is located within the first grid-space, than comprised by the second grid score, the first grid-space may be selected as the location of the mobile device.

Figure 7:
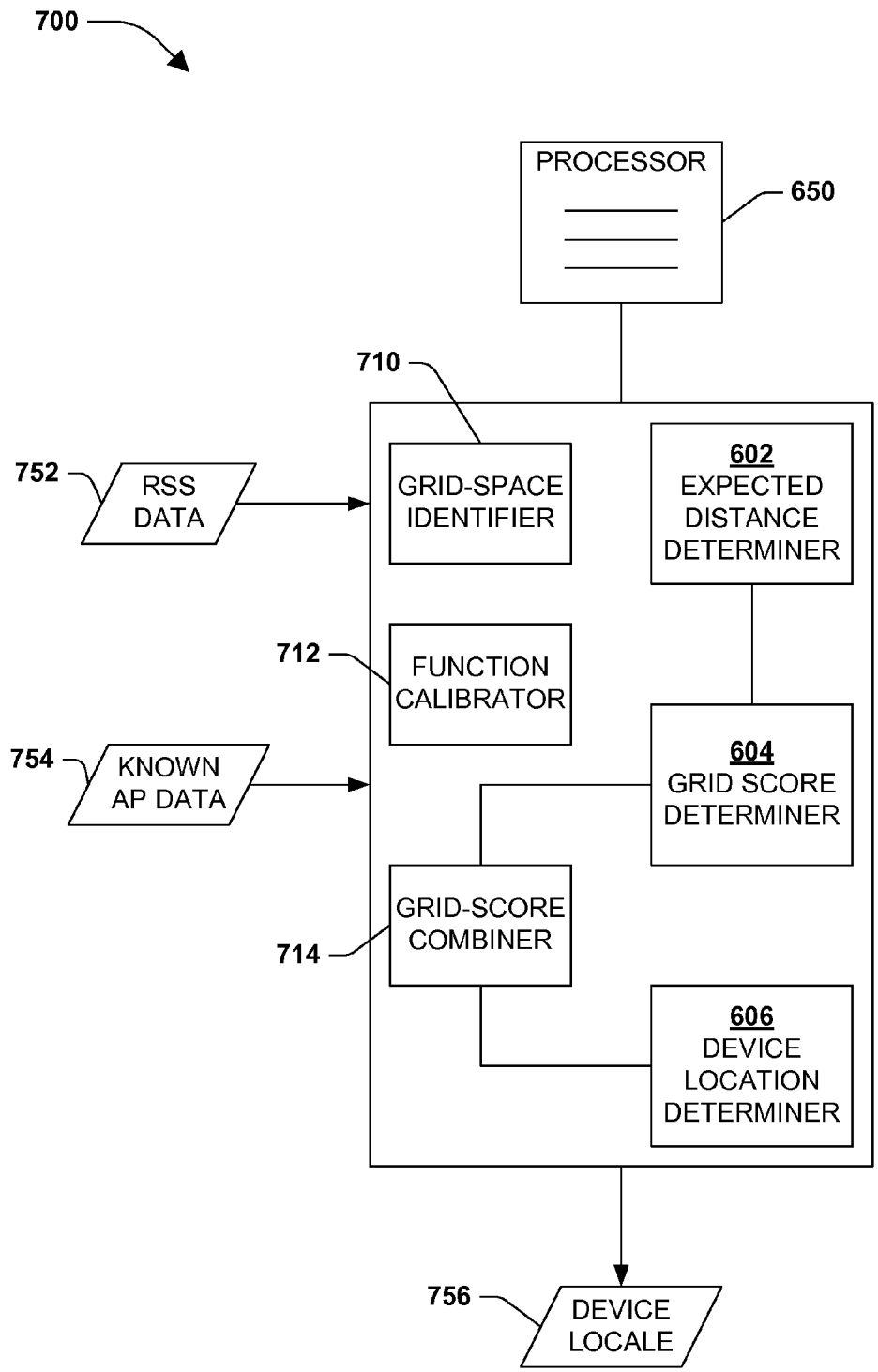
FIG. 7 is a component diagram illustrating an example embodiment where one or more portions of systems described herein may be implemented.

FIG. 7 is a component diagram illustrating an example embodiment 700 where one or more portions of systems described herein may be implemented. In this example 700, an extension of FIG. 6 is provided and thus description of elements, components, etc. described with respect to FIG. 6 may not be repeated for simplicity. In the example embodiment 700, a grid space identification component 710 can be configured to determine a grid space location, where the grid space location may be used to determine a known distance in combination with a known AP location, based at least on known AP data 754. As one example, the grid space identification component 710 may create a grid, comprising a plurality of grid spaces, which overlays a candidate area (e.g., a floor of a selected building) that may comprise the location of a mobile device. In this example, a location of the respective grid spaces may be known in relation to a position in the candidate area. In this way, along with a known AP location, a first known distance between a first grid space and a first AP may be identified.

In one embodiment, the grid space identification component 710 can be configured to determine a grid layout for an area (e.g., the candidate area) based at least on a set of one or more indications of RSS 752 received from the mobile device. As one example, the set of one or more indications of RSS 752 may be used to identify the candidate area, comprising the location of the mobile device, by filtering out those RSSs that do not meet a RSS threshold. For example, an AP that is outside of the candidate area (e.g., another building and/or floor) may comprise a RSS that is below the RSS threshold. In this way, a filtered set of one or more indications of RSS may comprise one or more APs that are comprised within the candidate area, and thereby are within the grid layout.

In one embodiment, the expected distance determination component 602 may be configured to combine a path loss function for a grid space with an indication of RSS associated with an AP to determine an expected distance between the grid space and the AP. Further, a function calibration component 712 may be configured to calibrate a path loss function for an AP. As one example, a base (e.g., "ideal") path loss function may not account for environment conditions of the candidate area (e.g., building configuration, building components, electronic devices, etc.). In this example, the base path loss function may be calibrated for a first AP in the candidate area (e.g., and the second AP, third AP, etc.), resulting in a first path loss function (e.g., and a second path loss function, third path loss function, etc.).

In one embodiment, the function calibration component 712 may calibrate the base path loss function for an AP (e.g., first AP) by determining an expected AP distance between a first AP and a second AP using a first AP RSS, where the first AP RSS comprises an indication of signal strength for a signal transmitted from the first AP and received by the second AP. Further, in this embodiment, the function calibration component 712 may determine an AP difference based at least on a combination of the expected AP distance and a known AP distance, where the known AP distance comprises a known distance between the first AP and the second AP. Additionally, the base path loss function may be adjusted (e.g., for the first AP) based at least upon the AP difference. In this way, for example, the calibrated path-loss function (e.g., for the first AP) may account for the real-world environment comprised by the candidate area.

In the example embodiment 700, a grid score combination component 714 may be configured to combine the grid score (e.g., a first grid score for the first grid-space) with a grid score function resulting in a modified grid score (e.g., a first modified grid score). As one example, the grid score function may be configured to provide a modified grid score that indicates a probability that the mobile device is located in the corresponding grid-space. As another example, the grid score function may be configured to provide a modified grid score that is weighted based on one or more weighting factors, such as a ranking of one or more RSSs for the grid-space.

In one embodiment, the grid score combination component 714 may be configured to combine a first grid score corresponding to a first AP for the grid space (e.g., the first grid space), a second grid score corresponding to a second AP for the grid space, a first modified grid score corresponding to the first AP for the grid space, and/or a second modified grid score corresponding to the second AP for the grid space, resulting in an overall grid score for the grid space. That is, for example, a first overall grid score for the first grid space may comprise a combination of grid scores from respective APs in the candidate area. As another example, the first overall grid score for the first grid space may comprise a combination of modified grid scores from respective APs in the candidate area. In one embodiment, the overall grid score may be used to identify the location 756 of the mobile device in the candidate area.

Figure 8:
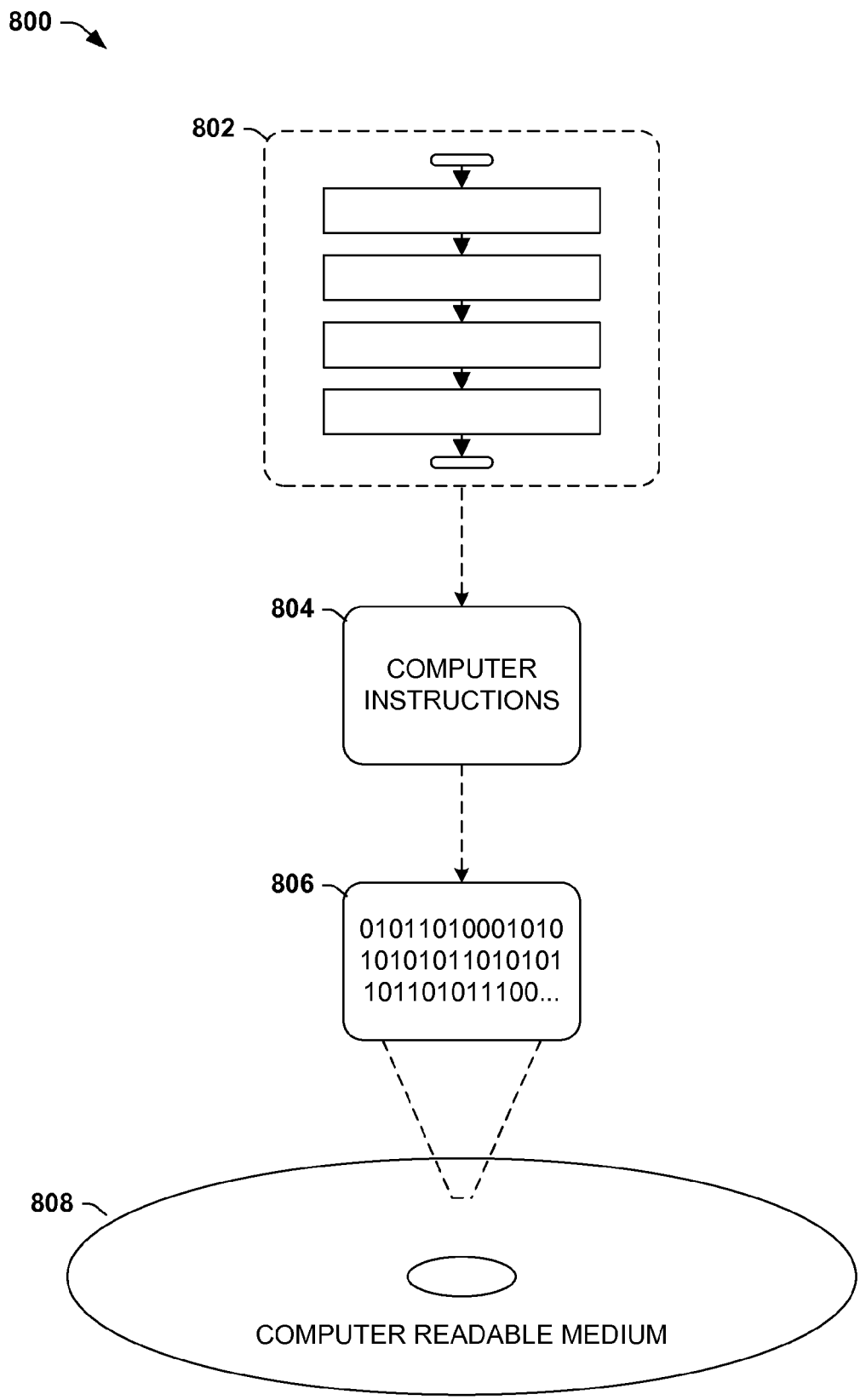
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 600 of FIG. 6, for example.

Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Figure 9:
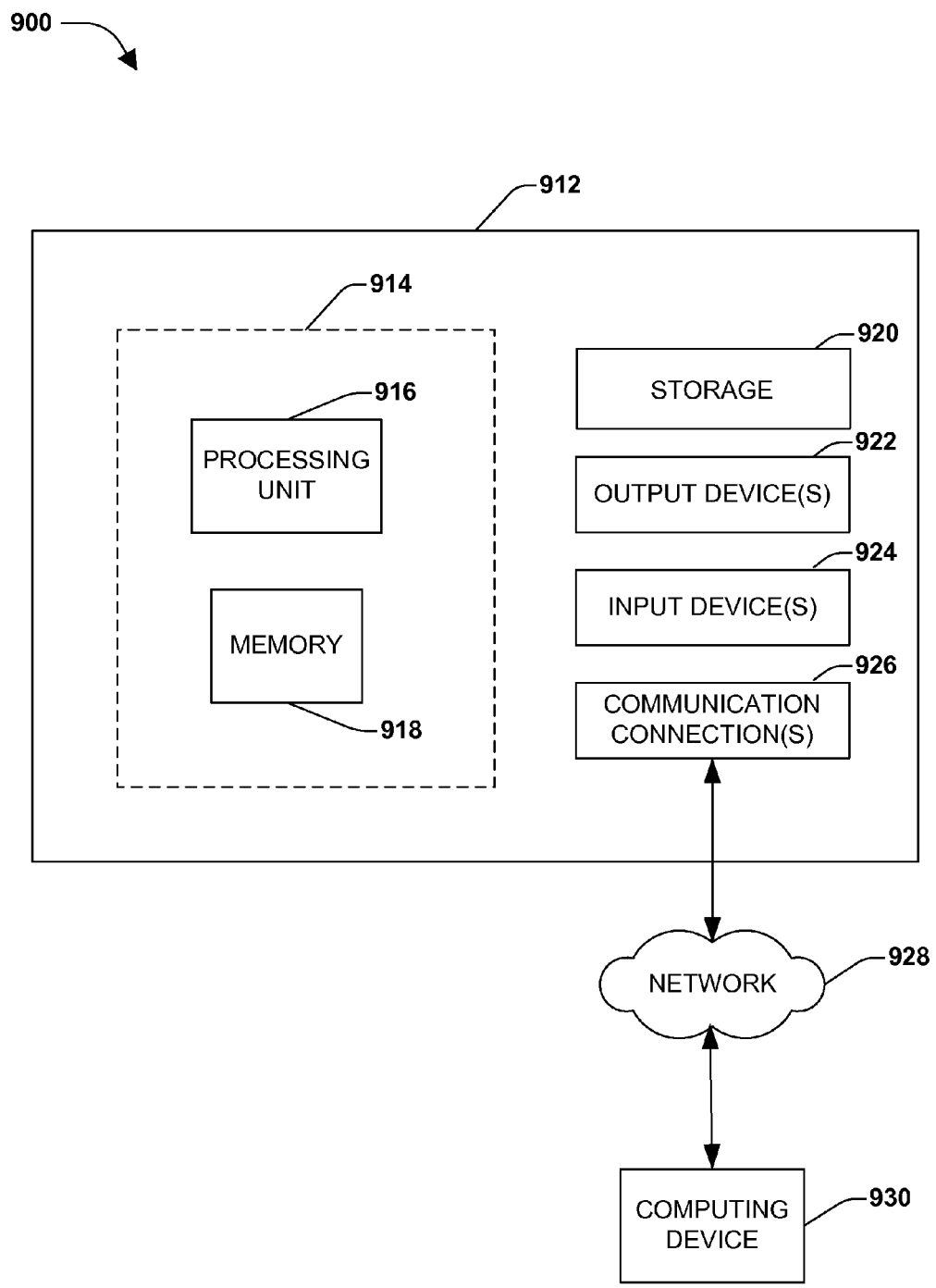
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer based method for identifying a location of a mobile device, comprising:
    determining a first expected distance between a first grid space associated with a mobile device and a first access point (AP) using a first received signal strength (RSS), the first RSS comprising an indication of signal strength for the first AP, the determining comprising combining the first RSS with a first grid path loss function to determine the first expected distance;
    determining a first grid score for the first grid space based at least on a combination of the first expected distance and a first known distance, the first known distance comprising a known distance between the first AP and the first grid space; and
    identifying a mobile device location of the mobile device based at least on the first grid score, at least a portion of the method implemented at least in part via a processing unit.

2. The method of claim 1, the first RSS comprising an indication of signal strength for a signal transmitted from the first AP and received by the mobile device.

3. The method of claim 1, comprising determining the first known distance, comprising calculating a distance between a known location of the first grid space and a known location of the first AP.

4. The method of claim 1, the first RSS associated with a first AP identifier (ID), the first AP ID identifying the first AP.

5. The method of claim 4, the first AP ID associated with a known location of the first AP.

6. The method of claim 1, comprising:
    receiving a first unfiltered RSS set from the mobile device, the first unfiltered RSS set comprising at least the first RSS; and
    filtering the first unfiltered RSS set resulting in a first filtered RSS set, the first filtered RSS set comprising at least the first RSS if the first RSS meets a desired RSS threshold.

7. The method of claim 6, the first unfiltered RSS set comprising a plurality of indications of RSS respectively associated with a different AP.

8. The method of claim 6, comprising identifying the first grid space, the identifying the first grid space comprising determining a grid layout for an area based at least on the first filtered RSS set, the grid layout comprising at least the first grid space at a known location.

9. The method of claim 1, comprising:
    determining a second expected distance between the first grid space and a second AP using a second RSS, the second RSS comprising an indication of signal strength for a signal transmitted from the second AP and received by the mobile device; and
    the determining a first grid score comprising determining the first grid score based at least on:
        the combination of the first expected distance and the first known distance; and
        a combination of the second expected distance and a second known distance, the second known distance comprising a known distance between the second AP and the first grid space.

10. The method of claim 1, comprising:
    determining a second grid score for a second grid space, and the identifying a mobile device location comprising identifying the mobile device location based at least on the second grid score.

11. The method of claim 1, comprising:
    calibrating a base path loss function for the first AP resulting in the first grid path loss function.

12. The method of claim 11, the calibrating comprising:
    determining a first expected AP distance between the first AP and a second AP using a first AP RSS, the first AP RSS comprising an indication of signal strength for a signal transmitted from the first AP and received by the second AP;
    determining a first AP difference based at least on a combination of the first expected AP distance and a first known AP distance, the first known AP distance comprising a known distance between the first AP and the second AP; and
    adjusting the base path loss function based at least on the first AP difference.

13. A system for identifying a location of a mobile device, comprising:
    an expected distance determination component configured to determine an expected distance between a grid space associated with a mobile device and an access point (AP) using an indication of received signal strength (RSS) associated with the AP, the expected distance determination component configured to combine a base path loss function for the AP with the indication of RSS to determine the expected distance;
    a grid score determination component, operably coupled with the expected distance determination component, configured to determine a grid score for the grid space based at least on a combination of the expected distance and a known distance between the AP and the grid space; and
    a device location determination component, operably coupled with the grid score determination component, configured to identify a mobile device location of the mobile device based at least on the grid score, at least a portion of the system implemented at least in part via a processing unit.

14. The system of claim 13, comprising a grid space identification component configured to determine a grid space location, the grid space location used to determine the known distance in combination with a known AP location.

15. The system of claim 14, the grid space identification component configured to determine a grid layout for an area based at least on a set of one or more indications of RSS received from the mobile device, the grid layout comprising at least the grid space at the grid space location.

16. The system of claim 13, comprising a function calibration component configured to calibrate the base path loss function for the AP by:
    determining an expected AP distance between a first AP and a second AP using a first AP RSS, the first AP RSS comprising an indication of signal strength for a signal transmitted from the AP and received by the second AP;
    determining an AP difference based at least on a combination of the expected AP distance and a known AP distance, the known AP distance comprising a known distance between the AP and the second AP; and
    adjusting the base path loss function based at least on the AP difference.

17. The system of claim 13, comprising a grid score combination component configured to combine the grid score with a grid score function resulting in a modified grid score.

18. A computer readable memory comprising computer executable instructions that when executed perform a method for identifying a location of a mobile device, comprising:

identifying a first grid space associated with a mobile device, the identifying comprising determining a grid layout for an area based at least on a received set of one or more received signal strengths (RSSs), the set comprising a first RSS indicating a signal strength for a first access point (AP), the grid layout comprising at least the first grid space at a known location;

determining a first expected distance between the first grid space and the first AP comprising combining the first RSS with a path loss function;

determining a first known distance, comprising calculating a distance between the known location of the first grid space and a known location of the first AP;

determining a first grid score for the first grid space, based at least on a combination of the first expected distance and the first known distance; and identifying a mobile device location of the mobile device based at least on the first grid score.

19. The computer readable memory of claim 18, the first RSS associated with a first AP identifier (ID), the first AP ID identifying the first AP.

20. The computer readable memory of claim 18, the method comprising:

determining a second grid score for a second grid space and the identifying a mobile device location comprising identifying the mobile device location based at least on the second grid score.

* * * * *